United States Patent
Xu et al.

(10) Patent No.: US 9,331,837 B2
(45) Date of Patent: May 3, 2016

(54) METHOD AND DEVICE FOR DETECTING 1588 TIME ERROR BETWEEN NETWORK ELEMENTS

(75) Inventors: Jianxin Xu, Shenzhen (CN); Li He, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 116 days.

(21) Appl. No.: 14/356,205

(22) PCT Filed: Apr. 18, 2012

(86) PCT No.: PCT/CN2012/074297
§ 371 (c)(1),
(2), (4) Date: May 5, 2014

(87) PCT Pub. No.: WO2013/078820
PCT Pub. Date: Jun. 6, 2013

(65) Prior Publication Data
US 2015/0215108 A1    Jul. 30, 2015

(30) Foreign Application Priority Data

Nov. 30, 2011    (CN) .......................... 2011 1 0390599

(51) Int. Cl.
*G01R 31/08* (2006.01)
*H04L 7/00* (2006.01)
(Continued)

(52) U.S. Cl.
CPC ................ *H04L 7/0016* (2013.01); *H04J 3/14* (2013.01); *H04L 41/064* (2013.01); *H04L 43/106* (2013.01); *H04J 3/0667* (2013.01)

(58) Field of Classification Search
CPC ... H04L 7/0016; H04L 43/106; H04L 41/064; H04J 3/14; H04J 3/0667
See application file for complete search history.

(56) References Cited

U.S. PATENT DOCUMENTS 7,602,873 B2    10/2009    Eidson
7,821,958 B2    10/2010    Smith et al.
(Continued)

FOREIGN PATENT DOCUMENTS

CN    101141327 A    3/2008
CN    101904129 A    12/2010
(Continued)

OTHER PUBLICATIONS

International Search Report in international application No. PCT/CN2012/074297, mailed on Sep. 13, 2012.
(Continued)

*Primary Examiner* — Robert Wilson
(74) *Attorney, Agent, or Firm* — Brundidge & Stanger, P.C.

(57) ABSTRACT

A method and a device for detecting a 1588 time error between network elements are disclosed. The method includes: a 1588 time network is established for an entire network; when it is required to detect a 1588 time error between a network element and its opposite network element, the network elements transmit, probe packets, each including a local timestamp to each other; and the network element receiving a probe packet calculates, according to a preset time difference algorithm, a time difference between the local timestamp and the timestamp in the probe packet, determines, according to the time difference, whether there is a failure in a detection path, and reports an alarm when there is a failure in the detection path. The disclosure prevents erroneous time transmission due to the time error, thus ensuring the network stability.

14 Claims, 3 Drawing Sheets

(51) Int. Cl.
*H04J 3/14* (2006.01)
*H04L 12/26* (2006.01)
*H04L 12/24* (2006.01)
*H04J 3/06* (2006.01)

(56) References Cited

U.S. PATENT DOCUMENTS

| | | | |
|---|---|---|---|
| 8,107,502 B2* | 1/2012 | Darras | H04L 43/106 370/503 |
| 2007/0147562 A1 | 6/2007 | Eidson | |
| 2008/0232269 A1* | 9/2008 | Tatman | H04L 43/12 370/252 |
| 2009/0161744 A1 | 6/2009 | Smith et al. | |
| 2012/0106339 A1* | 5/2012 | Mishra | H04L 43/106 370/235 |
| 2012/0117180 A1* | 5/2012 | Ranasinghe | H04J 3/0667 709/208 |
| 2012/0307845 A1 | 12/2012 | Le Pallec et al. | |
| 2014/0043987 A1* | 2/2014 | Watve | H04L 45/70 370/252 |
| 2014/0247839 A1* | 9/2014 | Kingsley | H04J 3/0673 370/503 |
| 2015/0215108 A1* | 7/2015 | Xu | H04J 3/14 370/503 |

FOREIGN PATENT DOCUMENTS

| | | |
|---|---|---|
| CN | 102232278 A | 11/2011 |
| CN | 102754370 A | 10/2012 |
| EP | 2367309 A1 | 9/2011 |
| JP | 2009199139 A | 9/2009 |
| JP | 2013520057 A | 5/2013 |
| KR | 20120120413 A | 11/2012 |
| WO | 2011098466 A1 | 8/2011 |
| WO | 2012118178 A1 | 9/2012 |

OTHER PUBLICATIONS

English Translation of the Written Opinion of the International Search Authority in international application No. PCT/CN2012/074297, mailed on Sep. 13, 2012.
International Search Report issued in corresponding application No. PCT/CN2012/074297 on Sep. 13, 2012.
International Publication issued in corresponding application No. PCT/CN2012/074297 on Jun. 6, 2013.
EEE Standard for a Precision Clock Synchronization Protocol for Networked Measurement and Control Systems, International Standard, on Feb. 2, 2009, pp. 1-16.
Supplementary European Search Report in European application No. 12854150.5, mailed on Mar. 23, 2015.
IEEE Standard for a Precision Clock Synchronization Protocol for Networked Measurement and Control Systems, IEEE Instrumentation and Measurement Society, on Jul. 24, 2008, pp. 16-92.

* cited by examiner

METHOD AND DEVICE FOR DETECTING 1588 TIME ERROR BETWEEN NETWORK ELEMENTS

TECHNICAL FIELD

The disclosure relates to the communication field, and more particularly to a method and device for detecting a 1588 time error between network elements.

BACKGROUND

With the rapid development of network informatization, a Packet Transport Network (PTN), which consists of a large number of network devices, becomes more and more large and complex. A timing error may be caused during a network transmission process of 1588 time. The 1588 time transmission process may be corrected and compensated for a master port and a slave port between network elements. However, it cannot be learn whether the 1588 time is synchronous between a passive port and the master port of the network elements.

Timing error detection, which can timely remind a network operator of a timing error in a link, is of great importance. If an error value cannot be detected in time, a 1588 time error in a link may increase, which will eventually lead to a time synchronization failure.

No corresponding test method is specified by existing standards, and no corresponding test method is provided especially for 1588 time synchronization between peer-to-peer network elements. In actual network operation, there is no specific detection method for a 1588 time error in a peer-to-peer link, thus being unable to determine accurately whether there is a 1588 time error in a link.

SUMMARY

In view of this, the disclosure is intended to provide a method and device for detecting a 1588 time error between network elements, so as to solve the problem that there is no method for detecting a 1588 time error in the prior art.

The disclosure provides a method for detecting a 1588 time error between network elements. The method includes:

a 1588 time network is established for an entire network;

when it is required to detect a 1588 time error between a network element and its opposite network element, the network elements transmit probe packets, each including a local timestamp to each other; and the network element receiving a probe packet calculates, according to a preset time difference algorithm, a time difference between the local timestamp and the timestamp in the probe packet, determines, according to the time difference, whether there is a failure in a detection path, and reports an alarm when there is a failure in the detection path.

The disclosure further provides a device for detecting a 1588 time error. The device includes: a network configuration module, a probe packet transmission and reception module, a time difference calculation module and a failure determination module, wherein the network configuration module is configured to establish a 1588 time network;

the probe packet transmission and reception module is configured to, when it is required to detect a 1588 time error between a network element and its opposite network element, transmit a probe packet including a local timestamp to its opposite network element and receive a probe packet from its opposite network element;

the time difference calculation module is configured to calculate, according to a preset time difference algorithm, a time difference between the local timestamp and a timestamp in the probe packet received by the probe packet transmission and reception module; and the failure determination module is configure to determine, according to the time difference, whether there is a failure in a detection path, and report an alarm when there is a failure in the detection path.

In the disclosure, after a 1588 time network is established in the entire network, a 1588 time error can be detected through a probe packet between any two network elements. When the 1588 time error is greater than a preset threshold, it may be determined that there is a detection path failure between the network elements. Through detecting the 1588 time error between any two network elements, 1588 time transmission precision in a network may be acquired, and when a time path failure is detected, an alarm may be reported in time to notify a network management platform to maintain the 1588 time error, thus effectively preventing erroneous time transmission due to the time error and ensuring the network stability.

BRIEF DESCRIPTION OF THE DRAWINGS

The accompanying drawings illustrated here are intended to provide further understanding to the disclosure, and constitute a part of the disclosure. Illustrative embodiments of the disclosure and description thereof are used for explaining the disclosure, instead of constituting improper restriction to the disclosure. In the accompanying drawings.

DETAILED DESCRIPTION

The basic idea of the disclosure includes: a 1588 time network is established for an entire network; when it is required to detect a 1588 time error between a network element and its opposite network element, the network elements transmit, probe packets, each including a local timestamp to each other; and the network element receiving a probe packet calculates, according to a preset time difference algorithm, a time difference between the local timestamp and the timestamp in the probe packet, determines, according to the time difference, whether there is a failure in a detection path, and reports an alarm when there is a failure in the detection path.

In order to make the technical problem to be solved, the technical solution and beneficial effects of the disclosure clearer and easier to understand, the disclosure is further elaborated below with reference to the drawings and embodiments. It should be understood that the specific embodiments described herein are only intended to interpret the disclosure, instead of limiting the disclosure.

Methods for detecting a 1588 time error between network elements of the disclosure include a method for detecting a 1588 time error between adjacent network elements and a method for detecting a 1588 time error between non-adjacent network elements. The two methods may be defined as two modes of the disclosure, i.e., a pre-activated mode and an on-demand mode. A user may configure a detection mode for a network element as required, and the pre-activated mode is applied by default.

Figure 1:
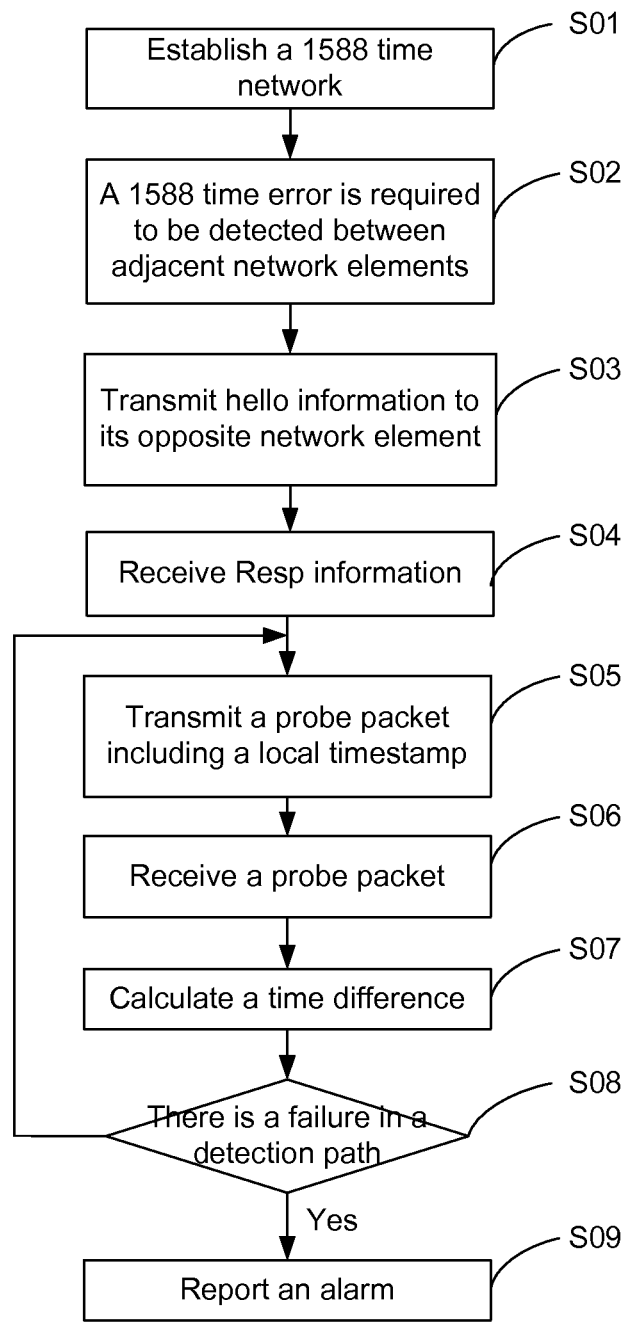
FIG. 1 is a flowchart of a first preferred embodiment of a method for detecting a 1588 time error between network elements according to the disclosure.

As shown in FIG. 1, it is a flowchart of a first preferred embodiment of a method for detecting a 1588 time error between network elements according to the disclosure. The embodiment illustrates the method for detecting a 1588 time error between adjacent network elements, i.e., the pre-activated mode. The method specifically includes the following steps:

S01: A 1588 time network is established for the entire network;

The step includes: configuring a time node type and a time algorithm for each network element in the network.

After the 1588 time network is established, a synchronization network is established for the 1588 time and a Sync E clock, and all network elements in the network support modes including a 1588 time mode, a Boundary Clock (BC) mode, an Ordinary Clock (OC) mode, a Transparent Clock (TC) mode, and an OC+TC mode. In the embodiment, all network elements in the network support a BC+TC mode.

S02: The 1588 time error is required to be detected between adjacent network elements.

S03: A network element transmits hello information to a master port of its opposite network element through a passive port of the network element.

The network element transmits and receives a probe packet through the passive port or the master port of the network element. Since a topological diagram between network elements is established and the connection relationship of ports between the network elements is also determined after the 1588 time network is established, a passive port or a master port for transmitting and receiving a probe packet during the detection of the 1588 time error between adjacent network elements needs to be selected according to the specific condition of ports for connecting the network elements. For example, if the passive port of network element A is connected with the master port of network element B and the master port of the network element A is connected with the passive port of network element E, then the network element A receives and transmits a probe packet through the passive port of the network element A if the 1588 time error needs to be detected for the network element A and the network element B. If the 1588 time error needs to be detected for the network element A and the network element E, the network element A receives and transmits a probe packet through the master port of the network element A.

S04: Resp information returned by the master port of its opposite network element is received.

S03 and S04 are optional steps, and may not be executed in other embodiments while a probe packet is sent directly.

S05: A probe packet including a local timestamp is transmitted through the passive port of the network element to the master port of its opposite network element at a preset transmission rate.

The probe packet is transmitted between the network elements in the TC mode.

In the disclosure, a corresponding format may be selected for the probe packet according to a specific application scenario.

S06: The probe packet is received.

S07: The time difference between the local timestamp and the timestamp in the probe packet is calculated according to a preset time difference algorithm.

In the embodiment, the time difference algorithm is implemented by subtracting the timestamp in the probe packet from the local timestamp.

S08: It is determined, according to the time difference, whether there is a failure in a detection path. If there is a failure in the detection path, S09 is executed; otherwise, S05 is executed;

In the step, through determining whether the time difference is greater than a preset time difference threshold, whether there is a failure in the detection path is determined. When the time difference is greater than the time difference threshold, there is a failure in the detection path.

S09: An alarm is reported.

For example, in the network, network element 6 and network element 3 are adjacent, the passive port of the network element 6 is connected with the master port of the network element 3, and the 1588 time error between the network element 6 and the network element 3 needs to be detected. The 1588 time error between the network element 6 and the network element 3 specifically includes:

the network element 6—the network element 3: the network element 6 transmits a probe packet of hello information through the passive port of the network element 6; after message interaction between the passive port of the network element 6 and the master port of network element 3 is performed normally, the network element 6 transmits a probe packet including timestamps T2-T1 and T4-T3 of the network element 6 through the passive port of the network element 6; after receiving the probe packet through the master port of the network element 3, the network element 3 determines whether the timestamps in the probe packet are balanced and symmetric first, and further determines, according to the determination result, whether to perform asymmetry compensation on the timestamps, then calculates a time difference using the timestamps in the probe packet and a timestamp of the network element 3, and if the time difference is greater than a preset time difference threshold, the network element 6 determines that there is a failure in a time link; and the network element 3—the network element 6: the network element 3 transmits a probe packet of hello information through the master port of the network element 3; after message interaction between the master port of the network element 3 and the passive port of network element 6 is performed normally, the network element 3 transmits a probe packet including timestamps T2-T1 and T4-T3 of the network element 3 through the master port of the network element 3; after receiving the probe packet through the passive port of the network element 6, the network element 6 determines whether the timestamps in the probe packet are balanced and symmetric first, and further determines, according to the determination result, whether to perform asymmetry compensation on the timestamps, then calculates a time difference using the timestamps in the probe packet and a timestamp of the network element 6, and if the time difference is greater than a preset time difference threshold, the network element 6 determines that there is a failure in a time link.

Figure 2:
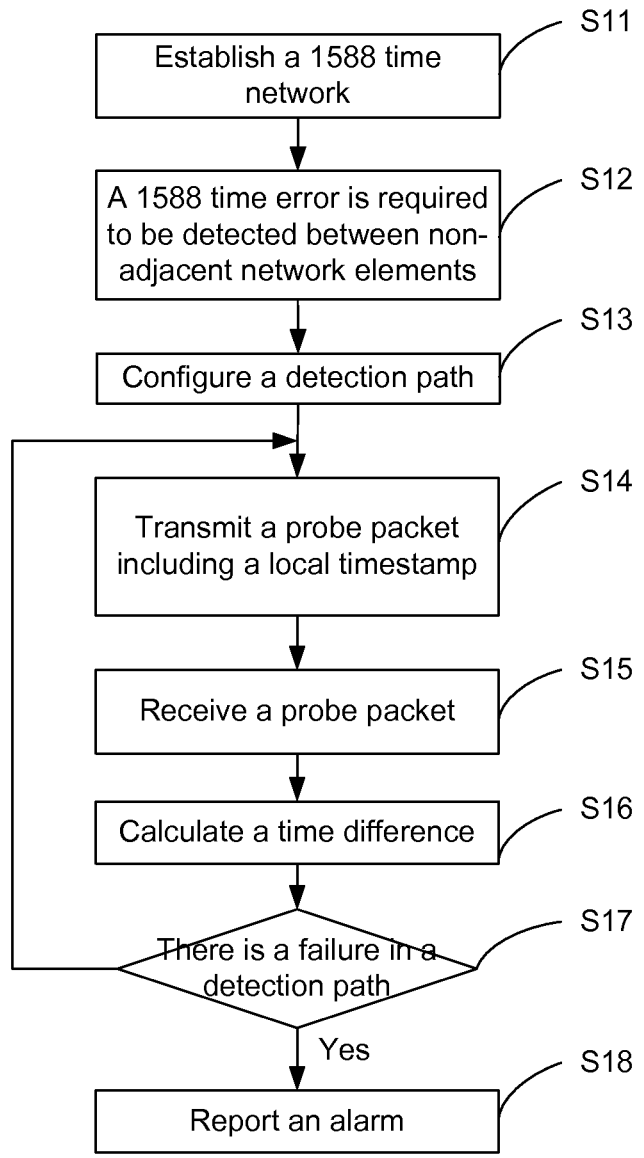
FIG. 2 is a flowchart of a second preferred embodiment of a method for detecting a 1588 time error between network elements according to the disclosure.

As shown in FIG. 2, it is a flowchart of a second preferred embodiment of a method for detecting a 1588 time error between network elements according to the disclosure. The embodiment illustrates the method for detecting a 1588 time error between non-adjacent network elements, i.e., the on-demand mode. The method specifically includes the following steps:

S11: A 1588 time network is established for the entire network.

S12: The 1588 time error is required to be detected between non-adjacent network elements.

S13: A detection path is configured for the current detection according to a time path between the network elements.

If the 1588 time is ETH1588, the detection path configuration is implemented in the aforementioned method by configuring a Virtual Local Area Network (VLAN) switched domain among all network elements in the time path by means of layer 2 unicast.

If the 1588 time is IP15888, the detection path configuration is implemented in the aforementioned method by configuring Internet Protocol (IP) routing on all network elements in the time path by means of layer 3 unicast.

The network element transmits and receives a probe packet through a passive port or a master port. Since a topological diagram between network elements is established and the connection relationship of ports between the network elements are also determined after the 1588 time network is established, the detection path needs to selected according to the determined port connection relationship when the detection path is configured for the non-adjacent network elements.

The port corresponding relationship of the embodiment is that a passive port corresponds to a master port. For example, the 1588 time network between non-adjacent network elements A and E is required to be detected; the passive port of the network element A is connected with network element B, and the master port of the network element A is connected with network element D; the passive port of the network element E is connected with network element C and the master port of the network element E is connected with network element F; there are two time paths between the network element A and the network element E, i.e., A-B-C-E and A-D-H-F-E respectively, then the time path A-D-H-F-E needs to be selected as the detection path in the embodiment. In other embodiment, a port corresponding relationship may be selected according to specific needs.

S14: A network element transmits, at a preset transmission rate, a probe packet including a local timestamp to the master port of its opposite network element through the passive port of the network element.

S15: The probe packet is received.

S16: The time difference between the local timestamp and the timestamp in the probe packet is calculated according to a preset time difference algorithm.

S17: It is determined, according to the time difference, whether there is a failure in a detection path. If there is a failure in the detection path, S18 is executed; otherwise, S14 is executed.

S18: An alarm is reported.

For example, there are 10 network elements in a network, i.e., network element 1 to network element 10, respectively, and detecting the 1588 time error between the network element 6 and the network element 8 specifically includes:

the network element 6—the network element 8: the network element 6 and the network element 8 are not adjacent network elements, thus a detection path is required to be configured; provided that a time path between the network element 6 and the network element 8 is: the network element 6—the network element 3—the network element 5—the network element 10—the network element 8; after the path is configured successfully, a 1588 time error detection path is established between the network element 6 and the network element 8; the network element 6 transmits a probe packet including timestamps T2-T1 and T4-T3 through the passive port of the network element 6; the probe packet passes through the detection path: the network element 6—the network element 3—the network element 5—the network element 10—the network element 8, and reaches the master port of the network element 8; after receiving the probe packet, the network element 8 determines whether the timestamps in the probe packet are balanced and symmetric first, and further determines, according to the determination result, whether to perform asymmetry compensation on the timestamps, then calculates a time difference using the timestamps in the probe packet and a timestamp of the network element 8, and if the time difference is greater than a preset time difference threshold, the network element 8 determines that there is a failure in a time link; and the network element 8—the network element 6 are processed in the similar way as the network element 6—the network element 8.

Figure 3:
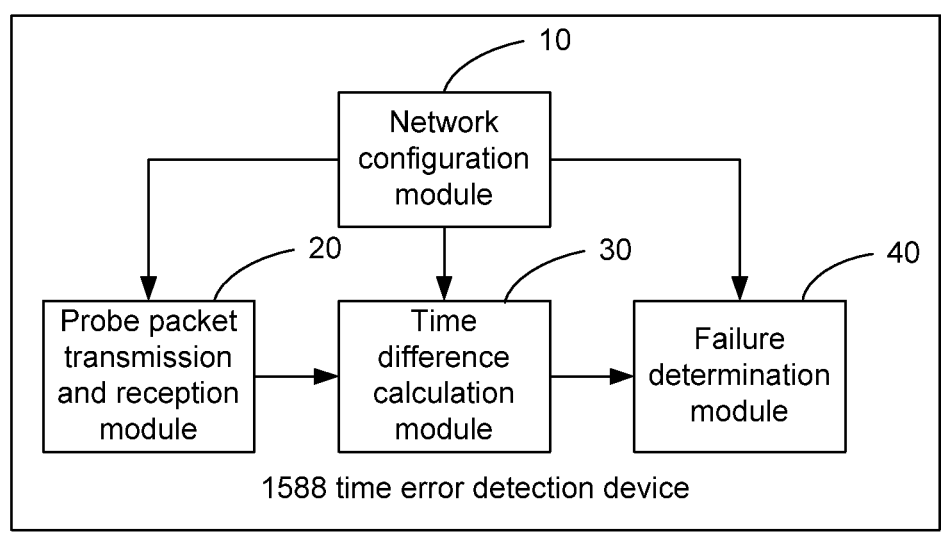
FIG. 3 is a functional block diagram of a preferred embodiment of a device for detecting a 1588 time error according to the disclosure.

As shown in FIG. 3, it is a functional block diagram of a preferred embodiment of a device for detecting a 1588 time error according to the disclosure. The embodiment includes a network configuration module 10, a probe packet transmission and reception module 20, a time difference calculation module 30 and a failure determination module 40.

The network configuration module 10 is configured to: establish a 1588 time network; provide a user with an interface for setting a transmission rate and store user setting; and when the network elements on which the 1588 time error is required to be detected are not adjacent network elements, configure, according to a time path between the network elements, a detection path for the current detection.

The probe packet transmission and reception module 20 is configured to: when it is required to detect a 1588 time error between a network element and its opposite network element, transmit hello information to its opposite network element; and after receiving Resp information returned by its opposite network element, transmit a probe packet including a local timestamp to its opposite network element and receive a probe packet from its opposite network element.

The time difference calculation module 30 is further configured to: determine whether the timestamp in the probe packet is balanced and symmetric, and when the timestamp in the probe packet is unbalanced or asymmetric, perform asymmetry compensation on the timestamp in the probe packet; and calculate, according to a preset time difference algorithm, a time difference between the local timestamp and a timestamp in the probe packet received by the probe packet transmission and reception module.

The failure determination module 40 is configured to: determine whether the time different is greater than a preset time different threshold; and determine, according to the time difference, whether there is a failure in a detection path, and report an alarm when there is a failure in the detection path.

The foregoing description shows and describes the preferred embodiments of the disclosure. However, as described previously, it should be understood that the disclosure is not limited to the form disclosed herein and should not be regarded as exclusion of other embodiments, but can be used to various other combinations, modifications and environments and can be modified according to the above teaching or technologies or knowledge of relevant fields within the scope of conception of the disclosure described herein. Furthermore, modifications and changes made by those skilled in the art without departing from the spirit and scope of the disclosure should fall within the scope of protection of the claims of the disclosure.

The invention claimed is:

1. A method for detecting a 1588 time error between network elements, the method comprising:
establishing a 1588 time network for an entire network;
when a detection of a 1588 time error between a network element and an opposite network element of the network element starts, transmitting between the network element and the opposite network element, probe packets each including a timestamp;

calculating, by the network element receiving a probe packet from the opposite network element according to a preset time difference algorithm, a time difference between a local timestamp and the timestamp in the probe packet; and determining, according to the time difference, whether there is a failure in a detection path and when there is a failure in the detection path, reporting an alarm.

2. The method according to claim 1, further comprising:
when the network element and the opposite network element on which the 1588 time error is to be detected are not adjacent network elements, configuring, according to a time path between the network element and the opposite network element, a detection path for current detection.

3. The method according to claim 2, wherein:
the probe packet is transmitted/received between the network element and the opposite network element through a passive port or a master port; or
the probe packet is transmitted between the network element and the opposite network element in a Transparent Clock (TC) mode.

4. The method according to claim 1, wherein:
the probe packet is transmitted/received between the network element and the opposite network element through a passive port or a master port; or
the probe packet is transmitted between the network element and the opposite network element in a Transparent Clock (TC) mode.

5. The method according to claim 1, wherein the time difference algorithm is implemented by subtracting the timestamp in the probe packet from the local timestamp.

6. The method according to claim 1, wherein the determining, by the network element, whether there is a failure in a detection path comprises:
determining whether the time difference is greater than a preset time difference threshold; and
when the time difference is greater than the preset time difference threshold, indicating there is a failure in the detection path.

7. A method for detecting a 1588 time error between network elements, the method comprising:
establishing a 1588 time network for an entire network;
when a detection of a 1588 time error between a network element and an opposite network element of the network element starts, transmitting between the network element and the opposite network element, probe packets each including a timestamp;
calculating, by the network element receiving a probe packet from the opposite network element according to a preset time difference algorithm, a time difference between a local timestamp and the timestamp in the probe packet;
determining, according to the time difference, whether there is a failure in a detection path and when there is a failure in the detection path, reporting an alarm; and
when the network element and the opposite network element on which the 1588 time error is to be detected are not adjacent network elements, configuring, according to a time path between the network element and the opposite network element, a detection path for current detection, wherein:
when the 1588 time is ETH1588, the detection path configuration is implemented by configuring a Virtual Local Area Network (VLAN) switched domain among network elements in the time path by means of layer 2 unicast; and
when the 1588 time is IP15888, the detection path configuration is implemented by configuring Internet Protocol (IP) routing on network elements in the time path by means of layer 3 unicast.

8. The method according to claim 7, further comprising:
before the network element calculates the time different, determining whether the timestamp in the probe packet is balanced and symmetric; and
when the timestamp in the probe packet is unbalanced or asymmetric, performing asymmetry compensation on the timestamp in the probe packet.

9. The method according to claim 8, further comprising:
before the network element transmits the probe packet to the opposite network element, transmitting hello information to the opposite network element; and
after receiving Resp information returned by the opposite network element, transmitting the probe packet to the opposite network element at a preset transmission rate.

10. A method for detecting a 1588 time error between network elements, the method comprising:
establishing a 1588 time network for an entire network;
when a detection of a 1588 time error between a network element and an opposite network element of the network element starts, transmitting between the network element and the opposite network element, probe packets each including a timestamp;
calculating, by the network element receiving a probe packet from the opposite network element according to a preset time difference algorithm, a time difference between a local timestamp and the timestamp in the probe packet;
determining, according to the time difference, whether there is a failure in a detection path and when there is a failure in the detection path, reporting an alarm before the network element calculates the time different, determining whether the timestamp in the probe packet is balanced and symmetric; and
when the timestamp in the probe packet is unbalanced or asymmetric, performing asymmetry compensation on the timestamp in the probe packet.

11. The method according to claim 10, further comprising:
before the network element transmits the probe packet to the opposite network element, transmitting hello information to the opposite network element; and
after receiving Resp information returned by the opposite network element, transmitting the probe packet to the opposite network element at a preset transmission rate.

12. A device for detecting a 1588 time error between network elements, the device comprising:
a processor; and
a memory for storing instructions executable by the processor;
wherein the processor is configured to:
establish a 1588 time network,
when a detection of a 1588 time error between a network element and an opposite network element of the network element starts, transmit between the network element and the opposite network element, probe packets each including a timestamp,
calculate, according to a preset time difference algorithm, a time difference between a local timestamp and the timestamp in the probe packet, and determine, according to the time difference, whether there is a failure in a detection path, and report an alarm when there is a failure in the detection path.

13. The device according to claim 12, wherein:

the processor is further configured to:

provide a user with an interface for setting a transmission rate and store user setting and when the network element and the opposite network element on which the 1588 time error is to be detected are not adjacent network elements, configure, according to a time path between the network element and the opposite network element, a detection path for current detection;

before transmitting the probe packet to the opposite network element, transmit hello information to the opposite network element;

before calculating the time different, determine whether the timestamp in the probe packet is balanced and symmetric and when the timestamp in the probe packet is unbalanced or asymmetric, perform asymmetry compensation on the timestamp in the probe packet; and determine whether the time different is greater than a preset time different threshold.

14. A method for detecting a 1588 time error between network elements, the method comprising:

establishing a 1588 time network for an entire network;

when a detection of a 1588 time error between a network element and an opposite network element of the network element starts, transmitting between the network element and the opposite network element, probe packets each including a timestamp;

calculating, by the network element receiving a probe packet from the opposite network element according to a preset time difference algorithm, a time difference between a local timestamp and the timestamp in the probe packet;

determining, according to the time difference, whether there is a failure in a detection path and when there is a failure in the detection path, reporting an alarm, wherein the time difference algorithm is implemented by subtracting the timestamp in the probe packet from the local timestamp, wherein the determining, by the network element, whether there is a failure in a detection path comprises:

determining whether the time difference is greater than a preset time difference threshold; and when the time difference is greater than the preset time difference threshold, there is a failure in the detection path.

\* \* \* \* \*